3,255,236
ESTER-ESTER INTERCHANGE IN THE PRESENCE OF AN ALUMINUM ALKYL CATALYST
Charles M. Selwitz, Pitcairn, and Robert A. Walde, Pittsburgh, Pa., assignors to Gulf Research & Development Company, Pittsburgh, Pa., a corporation of Delaware
No Drawing. Filed May 29, 1962, Ser. No. 198,441
8 Claims. (Cl. 260—475)

This invention relates to ester interchange reactions and more particularly to a process for catalytically effecting ester-ester interchange reactions.

An ester interchange reaction is a reaction between an ester and another compound, such as, for example, the reaction of an ester with an alcohol, an acid or another ester, to form an ester different from the starting ester. When the reactant is an alcohol, the reaction is referred to as alcoholysis. When the reactant is an acid, the reaction is referred to as acidolysis. When the reactant is an ester, the reaction is referred to as ester-ester interchange. It is the latter reaction with which the present invention is concerned.

Ester-ester interchange reactions which comprise the reaction between two esters to form two other esters have been known for almost a century. The ester-ester interchange reactions have not been as widely used commercially as alcoholysis in producing esters because the ester-ester interchange reaction generally requires a longer reaction time than alcoholysis to produce the same ester.

Various catalysts have been used in accelerating the ester-ester interchange reaction including sulfuric acid, phosphoric acid, sulfonic acids, compounds of tin, i.e., stannous hydroxide and metal alkoxides, particularly alkali metal alkoxides such as sodium methoxide. Of these catalysts, the alkali metal alkoxides have been particularly effective. While the alkali metal alkoxides have reduced the time required to effect ester-ester interchange reactions at low temperatures, the alkoxide catalysts have a disadvantage in that they frequently give rise to unwanted by-products which are difficult to separate from the desired esters.

We have found that the ester-ester interchange reaction can be efficiently conducted in the presence of an aluminum alkyl catalyst.

The aluminum alkyl catalyst which is employed in the process of the present invention has the following structural formula:

wherein $R_1$, $R_2$ and $R_3$, the same or different, are selected from the group consisting of alkyl radicals having from one to twenty carbon atoms, preferably from one to eight carbon atoms. Examples of aluminum alkyls which can be employed include trimethyl aluminum, triethyl aluminum, tripropyl aluminum, triisopropyl aluminum, tri-n-butyl aluminum, triisobutyl aluminum, tri-n-pentyl aluminum, tri-n-hexyl aluminum, tri-n-heptyl aluminum, tri-(3-methylheptyl)aluminum, tridiisobutyl aluminum, tri-n-octyl aluminum, triisooctyl aluminum, tri-(2-ethylhexyl) aluminum, trinonyl aluminum, tridecyl aluminum, tridodecyl aluminum, trioctadecyl aluminum, trieicosyl aluminum, methyl di-n-heptyl aluminum, ethyl propyl butyl aluminum, diethyl isobutyl aluminum and mixtures thereof.

The amount of the aluminum alkyl employed is a catalytic amount which, in general, comprises about 0.01 to about 10 mol percent based on the ester charge stock. In most instances, an amount corresponding to about 0.1 to about 5 mol percent of the ester charge stock is sufficient to effect the ester interchange reaction. Sufficient agitation is employed to obtain good mixing between the catalyst and the reactants.

In conducting the ester-ester interchange reaction in the presence of an aluminum alkyl, a temperature of at least 90° C. is required to initiate the interchange reaction. The preferred temperature range is about 110° to about 200° C., the upper temperature limit being below the temperature at which thermal decomposition of the catalyst occurs. The pressure at which the ester-ester interchange reaction is conducted is about 0.001 to about 500 pounds per square inch or more. The reaction is preferably conducted under anhydrous conditions in the absence of air to avoid undesired decomposition of the catalyst.

The reaction time required to effect the ester-ester interchange reaction varies over wide limits depending upon the reaction temperature and the amount of catalyst which is employed. In general, the reaction reaches equilibrium in about 1 to 4 hours. Naturally, if one of the product esters is removed from the reaction mass substantially as fast as it is formed, the equilibrium is shifted in the desired direction.

The esters which can be interchanged according to the process of the present invention can be organic esters of all kinds including monocarboxylic acid esters and dicarboxylic acid esters provided the esters are substantially completely esterified and substantially free from moisture. Thus, examples of the carboxylic acids used to obtain the carboxylic acid portion of the ester include acetic, propionic, butyric, valeric, caproic, enanthic, caprylic, pelargonic, capric, hendecanoic, lauric, tridecanoic, myristic, palmitic, margaric, stearic, malonic, succinic, glutaric, adipic, pimelic, suberic, azelaic, sebacic, benzoic, toluic, phthalic, isophthalic and terephthalic acids. The alcohol-derived portion of the carboxylic acid ester can be obtained from a monohydric, dihydric or trihydric alcohol. Examples of the alcohols used to obtain the alcohol-derived portion of the ester thus include methanol, ethanol, propyl alcohol, isopropyl alcohol, butyl alcohol, isobutyl alcohol, tert-butyl alcohol, n-amyl alcohol, isoamyl alcohol, 1-hexanol, cyclohexanol, 1-heptanol, 1-octanol, capryl alcohol, 1-decanol, 1-dodecanol, 1-tridecanol, 1-tetradecanol, cetyl alcohol, 1-octadecanol, benzyl alcohol, ethylene glycol, propylene glycol, trimethylene glycol and glycerol.

When at least one of the initial reactants is an ester of a monocarboxylic acid and a monohydric alcohol, the reaction mass consists of a mixture of esters. When the initial reactants comprise an ester of a dicarboxylic acid and a monohydric alcohol and an ester of a monocarboxylic acid and a dihydric alcohol, the reaction mass consists of a mixture of esters and polymers. In order to obtain the polymer in substantial yields, the ester of the monocarboxylic acid and monohydric alcohol formed in the course of the reaction should be removed from the reaction zone.

The invention can further be illustrated by reference to the following examples:

*Example 1*

Into a flask equiped with a stirrer, a reflux condenser and a thermometer was added 88 grams of ethyl acetate and 144 grams of isobutyl isobutyrate. To the stirred solution in the flask at room temperature was added 5 cc. of triisobutyl aluminum (1 mol percent based on the ester charge stock). The contents of the flask were then slowly heated to 95° C. There was no evidence of an interchange reaction occurring. The contents of the flask were then further heated with refluxing at 95° C. for 24 hours. The reaction product thus obtained was found by vapor phase chromatography to consist of 20 percent by weight of ethyl acetate, 17 percent by weight of ethyl isobutyrate, 21 percent by weight of isobutyl acetate and 42 percent by weight of isobutyl isobutyrate.

Example II

Into a flask equipped with a stirrer, a reflux condenser and a thermometer was added 88.1 grams of isobutyl acetate and 264.3 grams of ethyl isobutyrate. To the stirred solution in the flask at 27° C. was added 5 cc. of triisobutyl aluminum (0.6 mol percent based on the ester charge stock). The contents of the flask were then slowly heated. There was no evidence of an interchange reaction occurring until a reflux temperature of about 109° C. was reached. At the end of about 2 hours, the reaction mass was found by vapor phase chromatography to consist of 15 percent by weight of ethyl acetate, 58 percent by weight of ethyl isobutyrate, 8 percent by weight of isobutyl acetate and 19 percent by weight of isobutyl isobutyrate.

Example III

To a mixture of 50 grams of ethylene glycol diacetate and 67 grams of dimethyl terephthalate heated with stirring under an atmosphere of dry nitrogen to 120° C. was added 4 cc. of triethyl aluminum (4.6 mol percent based on the ester charged stock). The mixture was further heated with stirring to 150° C. at which temperature there was a rapid evolution of methyl acetate which was removed through a Stark and Dean trap. A total of 23 grams of methyl acetate were removed. The polymer product which remained in the flask was a pale yellow solid having a molecular weight of 458. The polymer is believed to have the following formula:

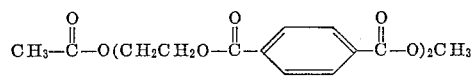

While our invention is described above with reference to various specific examples and embodiments, it will be understood that the invention is not limited to such illustrative examples and embodiments and may be variously practiced within the scope of the claims hereinafter made.

We claim:

1. In the process of catalytically effecting ester-ester interchange between carboxylic acid esters under anhydrous conditions, the improvement which comprises incorporating with the reactants a catalytic amount of an aluminum alkyl having the structural formula

wherein $R_1$, $R_2$ and $R_3$ are selected from the group consisting of alkyl radicals having from one to twenty carbon atoms and heating the reactants in the liquid phase at a temperature of about 90° to about 200° C. to effect the ester-ester interchange reaction.

2. In the process of catalytically effecting ester-ester interchange between esters of monocarboxylic acids and monohydric alcohols under anhydrous conditions, the improvement which comprises incorporating with the reactants a catalytic amount of an aluminum alkyl having the structural formula

wherein $R_1$, $R_2$ and $R_3$ are selected from the group consisting of alkyl radicals having from one to twenty carbon atoms and heating the reactants in the liquid phase at a temperature of about 90° to about 200° C. to effect the ester-ester interchange reaction.

3. In the process of catalytically effecting ester-ester interchange between an ester of a dicarboxylic acid and a monohydric alcohol and an ester of a monocarboxylic acid and a dihydric alcohol under anhydrous conditions, the improvement which comprises incorporating with the reactants a catalytic amount of an aluminum alkyl having the structural formula

wherein $R_1$, $R_2$ and $R_3$ are selected from the group consisting of alkyl radicals having from one to twenty carbon atoms and heating the reactants in the liquid phase at a temperature of about 90° to about 200° C. to effect the ester-ester interchange reaction.

4. In the process of catalytically effecting ester-ester interchange between carboxylic acid esters under anhydrous conditons, the improvement which comprises incorporating with the reactants a catalytic amount of triethyl aluminum, and heating the reactants in the liquid phase at a temperature of about 90° to about 200° C. to effect the ester-ester interchange reaction.

5. In the process of catalytically effecting ester-ester interchange between carboxylic acid esters under anhydrous conditons, the improvement which comprises incorporating with the reactants a catalytic amount of triisobutyl aluminum, and heating the reactants in the liquid phase at a temperature of about 90° to about 200° C. to effect the ester-ester interchange reaction.

6. In the process of catalytically effecting ester-ester interchange between ethyl acetate and isobutyl isobutyrate under anhydrous conditons, the improvement which comprises incorporating with the reactants a catalytic amount of triisobutyl aluminum, and refluxing the reactants in the liquid phase at a temperature of about 95° C. to effect the ester-ester interchange reaction.

7. In the process of catalytically effecting ester-ester interchange between ethyl isobutyrate and isobutyl acetate under anhydrous conditions, the improvement which comprises incorporating with the reactants a catalytic amount of triisobutyl aluminum and refluxing the reactants in the liquid phase at a temperature of about 110° C. to effect the ester-ester interchange reaction.

8. In the process of catalytically effecting ester-ester interchange between ethylene glycol diacetate and dimethyl terephthalate under anhydrous conditons, the improvement which comprises incorporating with the reactants a catalytic amount of triethyl aluminum, heating the reactants in the liquid phase at a temperature of about 150° C. to effect ester-ester interchange and removing methyl acetate from the reaction mass.

References Cited by the Examiner

UNITED STATES PATENTS 2,388,428   11/1945   Mavity _____ 260—448

OTHER REFERENCES

Fieser et al.: Organic Chemistry (Boston, 1956), page 537.

Groggins: Unit Processes in Organic Chemistry (New York, 1952), pages 607–9, 616–19.

Nobis: Ind. Eng. Chem., vol. 49, pages 44A–46A (1957).

LORRAINE A. WEINBERGER, *Primary Examiner.*

DURAL McCUTCHEN, *Examiner.*

A. D. ROLLINS, T. L. GALLOWAY,
*Assistant Examiners.*